United States Patent [19]

Niedermeier et al.

[11] Patent Number: 5,069,560
[45] Date of Patent: Dec. 3, 1991

[54] CAGE FOR SEALING A BEARING

[75] Inventors: Rudolf Niedermeier, Gerolzhofen; Johannes Schottdorf, Hammelburg, both of Fed. Rep. of Germany

[73] Assignee: FAG Kugelfischer Georg Schafer, Fed. Rep. of Germany

[21] Appl. No.: 614,619

[22] Filed: Nov. 16, 1990

[30] Foreign Application Priority Data

Dec. 4, 1989 [DE] Fed. Rep. of Germany ... 8914265[U]

[51] Int. Cl.⁵ .................. F16C 33/72; F16C 33/38
[52] U.S. Cl. ..................... 384/486; 384/523
[58] Field of Search ........ 384/470, 477, 482, 484–486, 384/523, 526, 527, 572, 576

[56] References Cited

U.S. PATENT DOCUMENTS 3,554,621  1/1971  McAllister ........................... 384/484
3,788,714  1/1974  Degioia et al. ...................... 384/482

FOREIGN PATENT DOCUMENTS 3336889  4/1985  Fed. Rep. of Germany ...... 384/572
1327643  4/1963  France ................................. 384/484
10140    1/1980  Japan .................................. 384/527
2115889  9/1983  United Kingdom ............... 384/576

Primary Examiner—Thomas R. Hannon
Attorney, Agent, or Firm—Ostrolenk, Faber, Gerb & Soffen

[57] ABSTRACT

A ball bearing having a cage which on its opposite axial ends has respective radially inward, obliquely axially outwardly and radially inwardly directed projections and has respective radially outward, obliquely axially outwardly and radially outwardly directed projections. Each projection extends into a cooperatingly placed and shaped annular groove defined in the raceway of the respective inner and outer rings. Each projection and the sealing lip at its end has a lateral surface which is parallel to one of the lateral walls of the groove and is spaced therefrom. The sealing lip has a second, adjacent lateral surface which is parallel to a second adjacent wall of the groove and is spaced therefrom, providing a lengthened sealing slot. The end of the sealing lip rests against a third lateral wall of the groove which extends at least approximately parallel to the bearing axis.

11 Claims, 1 Drawing Sheet 5,069,560

CAGE FOR SEALING A BEARING

BACKGROUND OF THE INVENTION

The invention relates to a bearing cage or separator which cooperates with the bearing rings to seal a bearing, and particularly useful to seal lubricant in the bearing.

A ball bearing of this type is disclosed in Federal Republic of Germany Utility Model 19 14 884. The cage includes flange-like rims on all sides, which are developed as sealing lips and extend into edge grooves provided in the bearing races. Their lips can also rest therein. Although a certain sealing action is achieved, it is not optimal. The labyrinth sections between the lips and the groove walls are very short. Furthermore, with the groove development shown, lubricant can easily be conveyed axially toward the outside.

SUMMARY OF THE INVENTION

It is therefore the object of the invention to improve a bearing of the above type and, in particular, to provide an embodiment which has relatively longer labyrinth sections and which avoids a danger that lubricant can escape from the bearing.

The invention concerns a cage for a bearing and especially a ball bearing. The cage has opposite axial ends each with a respective radially inwardly located, obliquely axially outwardly, while radially inwardly directed annular projection and with a radially outwardly located, obliquely axially outwardly, while radially outwardly directed annular projection. Each annular projection extends into a respective cooperatingly axially and radially placed and shaped annular groove defined in the raceway of the respective inner and outer ring toward which the projection projects. Each projection and a sealing lip defined at its end has a first lateral surface which is parallel to one of the lateral walls defining the groove and is spaced from that groove surface defining a lubricant trapping slot in the groove. The end of the sealing lip rests against another of the lateral walls defining the groove and that wall extends approximately perpendicular to the bearing axis. Another surface of the projection, between the first surface and the end of the projection, is spaced away from another wall of the groove, preferably another wall parallel to that other surface, increasing the length of the slot in the groove.

The projections of the preferably single-piece window cage of the invention can easily be manufactured due to the elasticity of the projections, which results from the selection of their materials and from the shaping. The obliquely outwardly or inwardly directed projections extend into annular grooves which are defined respectively in the raceways of the outer and inner rings, axially outward of a row of bearing elements, namely balls. The grooves are shaped in cross-section to be closed on three sides, if they are trapezoidal in shape, and are open on the raceway surface. The shaping of the grooves substantially increases the length of the labyrinth gaps from inside the bearing and past the annular projections for increasing the sealing action. Furthermore, because each axially outer, lateral side of a groove forms a barrier, it is much more difficult for lubricant which has passed into the region of the labyrinth gaps to escape out of the groove and toward the outside of the bearing This assures that the required quantity of lubricant is retained in the anti-friction bearing, which may be of the type that is lubricated for life.

In one preferred embodiment, that oblique surface of each projection which is above and faces toward a corresponding raceway is approximately parallel to the corresponding groove wall past which that projection surface projects inside the groove. This additionally lengthens the labyrinth gaps at these places, providing a further increase in the sealing action.

BRIEF DESCRIPTION OF THE DRAWINGS

Other objects and features of the invention are explained in detail with reference to the drawings, in which.

DESCRIPTION OF A PREFERRED EMBODIMENT

Figure 1:
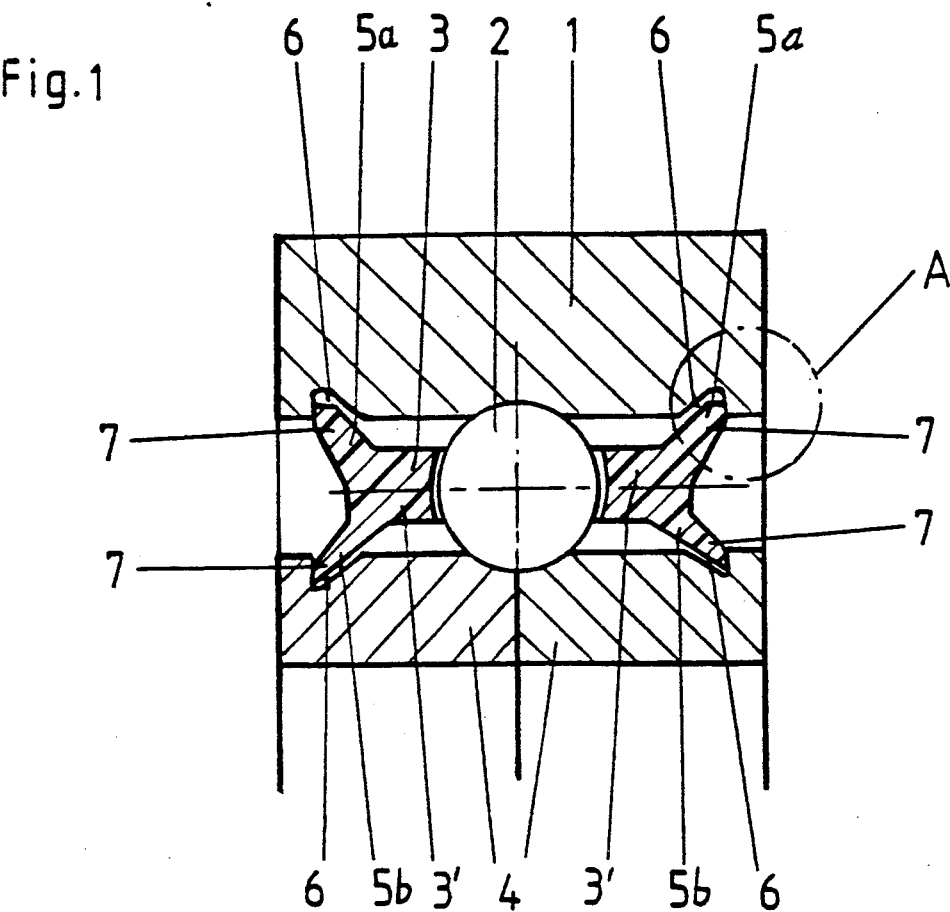
FIG. 1 shows a partial cross-section through a ball bearing having the cage of the invention.

In FIG. 1, a bearing comprises a single-piece outer ring 1, the rolling elements and particularly bearing balls 2, which are kept spaced circumferentially apart by the window cage 3, and the bipartite, axially separated inner ring 4. The inner ring is separated in the axial region of the balls 2.

The cage 3 has two axially opposite ring parts 3'. Each cage part 3' has respective projections 5, and particularly radially outer projections 5a toward the outer ring 1 and radially inner projections 5b toward the inner rings 4, that end in respective sealing lips 7, and the projections and their lips are directed obliquely axially outward and also extend radially into annular grooves 6 formed on the opposed, facing, raceway defining surfaces of the outer and inner rings 1 and 4. The axially outer projections 5a project obliquely axially outwardly and radially outwardly. The axially inner projections 5b project obliquely axially outwardly but radially inwardly.

Figure 2:
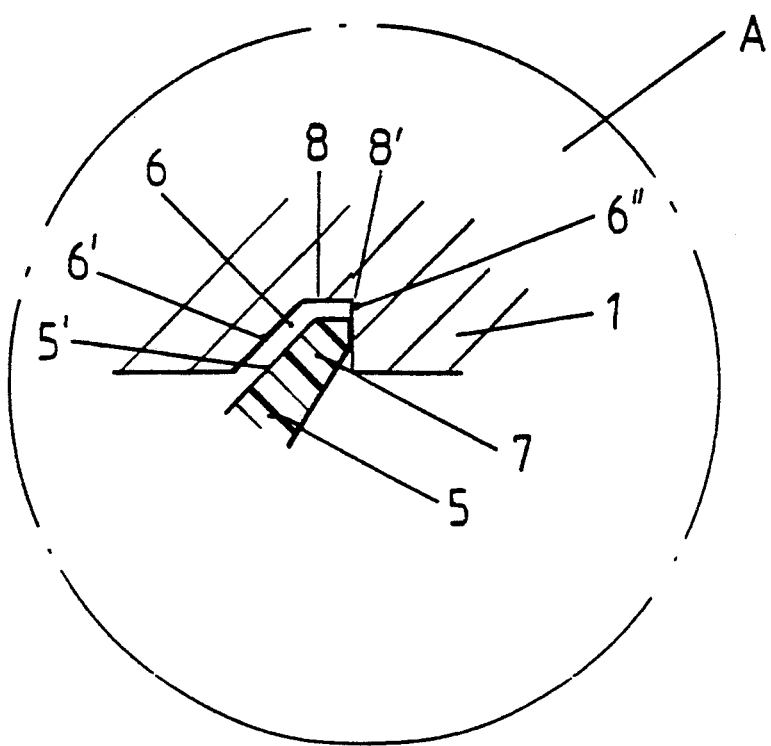
FIG. 2 shows the detail A of FIG. 1 on a larger scale.

A longer length pathway sealing slot is provided by the grooves 6 because the walls defining the grooves surround the sealing lips 7 of the projections on three sides. These sealing conditions become even more favorable because of an oblique arrangement of the inner lateral wall 6' of the groove 6, which is the wall in the groove that extends in from the raceway surface and faces obliquely outward toward that surface. As can be noted from FIG. 2, the wall 6' is opposite and spaced from a correspondingly inclined, parallel lateral surface 5' of the respective projection 5. This defines an elongate sealing slot, which would trap escaping lubricant. The annular groove 6 is trapezoidal in cross-sectional shape, which facilitates manufacture of the groove in the ring. The trapezoidal shape provides a bottom wall 8 of the groove 6. The lateral surface 8' of the projection 5 is inclined from the surface 5' to be correspondingly inclined parallel to the wall 8 and is also spaced from the wall 8, further elongating the sealing slot.

The axially outer lateral wall 6" of the groove 6 may be oriented across and particularly at least approximately perpendicular to the bearing axis. This causes the axially outer end of the sealing lip 7 to rest against the groove wall 6", which produces an optimal seal there for preventing the emergence of lubricant from within the axial annular space enclosed between the projections 5 and cage lips 7.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A bearing comprising a radially inward inner ring, a radially outward ring, a plurality of bearing rolling elements disposed between the inner and the outer rings, the inner and the outer rings having respective opposed inner and outer raceways on which the rolling elements travel, and a bearing separator cage between the inner and the outer rings for receiving and separating the rolling elements between the rings;

the rings having opposite axial ends; axially outwardly past each axial side of the rolling elements, the inner raceway of the inner ring having a radially inwardly directed annular groove and the outer raceway of the outer ring having a radially outwardly directed annular groove; each of the annular grooves in the inner and outer raceways includes an obliquely oriented lateral wall extending in from the respective raceway, with the lateral walls of the annular grooves in the inner ring extending obliquely axially and radially inwardly and the lateral walls of the annular grooves in the outer ring extending obliquely axially outwardly and radially outwardly;

axially outwardly past each axial side of the rolling elements, the cage having a respective first obliquely axially outwardly and radially inwardly directed projection with a first sealing lip at the end of the first projection and being so placed on the cage and so shaped as to extend into the respective radially inwardly directed annular groove in the inner raceway, and the cage having a respective outwardly directed projection with a second sealing lip at the end of the second projection and being so placed on the cage and so shaped as to extend into the respective outwardly directed annular groove in the outer raceway; the respective projection in each of the grooves having a respective oblique surface which is parallel to and opposite the lateral wall of the groove;

each of the annular grooves in the inner and outer raceways further including a respective second lateral wall of each of the grooves in the inner and outer rings and the respective sealing lip of the projection in each groove extends toward and is of a length to rest against the second lateral wall of the groove.

2. The ball bearing of claim 1, wherein each ring is shaped to define three walls of each annular groove which are closed and an open side at the respective raceway.

3. The ball bearing of claim 2, wherein the cage is of a single piece.

4. The ball bearing of claim 2, wherein the inner ring is separated into axially separate pieces in the axial region of the rolling elements.

5. The ball bearing of claim 2, wherein each of the rings is shaped to define the respective annular grooves therein to be generally trapezoidal in shape wherein the obliquely oriented and the second lateral walls are two of the sides of the trapezoid and those two sides are separated by a third wall of the trapezoid.

6. The ball bearing of claim 5, wherein the respective sealing lip of the projection in each groove includes a second surface which rests against the second lateral wall of the groove and includes a third surface which is normally parallel to and opposite and spaced from the third wall of the groove for also defining a slot, and the slots at the oblique and the third surfaces of the projection lip are continuous into each other.

7. The ball bearing of claim 6, wherein each of the cage projections is a continuous flange extending annularly around the cage.

8. The ball bearing of claim 1, wherein the bearing rolling elements are balls, the cage supports and separates the balls, the raceways are adapted for receiving the balls and the bearing is a ball bearing.

9. The ball bearing of claim 4, wherein the obliquely oriented lateral wall of each groove and the respective opposite parallel and oblique surface of the projection in the groove are normally spaced a distance apart in the groove defining a slot.

10. The ball bearing of claim 7, wherein the second lateral wall of the groove is oriented approximately perpendicular to the axis of the bearing.

11. The ball bearing of claim 10, wherein each of the rings is shaped to define the respective annular grooves therein to be generally trapezoidal in shape wherein the obliquely oriented and the second lateral walls are two of the sides of the trapezoid and those two sides are separated by a third wall of the trapezoid.

* * * * *